(12) United States Patent
Bamberg et al.

(10) Patent No.: US 8,778,255 B2
(45) Date of Patent: Jul. 15, 2014

(54) METHOD FOR GENERATIVELY MANUFACTURING A COMPONENT WITH AT LEAST ONE MARK

(75) Inventors: Joachim Bamberg, Dachau (DE); Roland Hessert, Herrsching (DE)

(73) Assignee: MTU Aero Engines GmbH, Munich (DE)

( * ) Notice: Subject to any disclaimer, the term of this patent is extended or adjusted under 35 U.S.C. 154(b) by 0 days.

(21) Appl. No.: 13/563,404

(22) Filed: Jul. 31, 2012

(65) Prior Publication Data

US 2013/0196118 A1   Aug. 1, 2013

(30) Foreign Application Priority Data

Aug. 1, 2011   (EP) .................................... 11176138

(51) Int. Cl.
*B29C 35/08* (2006.01)
*B29C 41/02* (2006.01)
*B29C 41/52* (2006.01)

(52) U.S. Cl.
USPC .......... 264/497; 264/40.1; 264/113; 264/232; 264/442; 264/460; 264/463

(58) Field of Classification Search
USPC ......... 264/113, 232, 308, 340, 401, 442, 460, 264/463, 494, 496, 497, 604, 40.1
See application file for complete search history.

(56) References Cited

U.S. PATENT DOCUMENTS

| | | | |
|---|---|---|---|
| 2009/0169841 A1* | 7/2009 | Abels et al. | ................ 264/497 X |
| 2011/0121492 A1 | 5/2011 | Philippi et al. | |
| 2012/0183701 A1* | 7/2012 | Pilz et al. | ...................... 427/504 |

FOREIGN PATENT DOCUMENTS

| | | | | |
|---|---|---|---|---|
| DE | 10 2009 055 661 A1 | 5/2011 | | |
| EP | 0764487 A1 * | 3/1997 | | ................... 264/497 |
| WO | WO-2011036087 A1 * | 3/2011 | | |

* cited by examiner

*Primary Examiner* — Leo B Tentoni
(74) *Attorney, Agent, or Firm* — Crowell & Moring LLP

(57) ABSTRACT

A component, in particular an engine component, which has at least one mark with a predetermined three-dimensional shape for determining a stress in the component and where the component is constructed by a generative manufacturing method, is disclosed.

7 Claims, 3 Drawing Sheets

METHOD FOR GENERATIVELY MANUFACTURING A COMPONENT WITH AT LEAST ONE MARK

This application claims the priority of European Patent Document No. EP 11176138.3, filed Aug. 1, 2011, the disclosure of which is expressly incorporated by reference herein.

BACKGROUND AND SUMMARY OF THE INVENTION

The present invention relates to a generatively manufactured component with at least one mark and a method for forming, repairing and/or replacing such a component by a generative manufacturing method.

Manufacturing a three-dimensional object layer-by-layer by means of a generative manufacturing method is known from German Patent Document No. DE 10 2009 055 661 A1.

A three-dimensional object manufactured in this way may have considerable internal stress, which can be determined only with great difficulty.

With this as the background, the object of the invention is making available an improved component and a method for manufacturing such a component.

According to the invention, a component, in particular an engine component, is made available, which has at least one mark with a predetermined three-dimensional shape for determining a stress in the component and wherein the component is constructed by a generative manufacturing method.

In addition, according to the invention a method is made available for constructing a component, in particular an engine component, wherein the method has the following steps in an embodiment: constructing the component by a generative manufacturing method and forming at least one mark in the component, which has a predetermined three-dimensional shape for determining a stress in the component.

The advantage of the component and the method for manufacturing the component is that the mark deforms in the component based on stress such as, for example, internal stress, thereby correspondingly changing the predetermined initial shape of the mark and is able to be detected by non-destructive methods, such as, for example, ultrasound or x-ray CT.

It is possible to determine stress such as internal stress of the component from the change in the initial shape of the mark and, for example, subsequently optimize the process parameters of the generative manufacturing method on the basis of the internal stress that is established in order to reduce the stress in the components. In addition, it is possible to easily remove such a mark later or leave it in the component as a stress sensor and reuse it.

The knowledge/idea underlying the present invention is forming a mark in the component with a defined three-dimensional shape in order to subsequently detect stress in the component by non-destructive test methods based on a change in the shape of the mark. To this end, the region of the mark is not solidified during the generative construction of the component by irradiation by an energy radiation source such as, for example, a laser or an electron-beam source, but remains non-irradiated.

Advantageous embodiments and further developments of the invention are disclosed in the dependent claims as well as in the description making reference to the drawings.

In an embodiment according to the invention, the mark is made of at least one slot, one sphere and/or one polygon. The advantage of a slot is that it is possible to track a change in the shape such as, for example, an opening and closing of the slot, very well by ultrasound or an x-ray CT.

In a further embodiment according to the invention, the component has at least one surface section with induced internal compressive stress. It is possible to evaluate the internal compressive stress, for example, as a function of the result of the stress in the component that is established in the at least one mark. The internal compressive stress may be induced in the surface section of the component by shot peening, surface rolling, laser shock radiation and/or ultrasonic impact treatment, for example.

According to another embodiment of the invention, the mark is configured or dimensioned in such a way that it can be detected by a non-destructive test method such as by an ultrasonic method and/or an x-ray CT method. It is possible to detect marks with a diameter or a width of between 4 μm and 8 μm, for example, very well by the ultrasonic method. It is possible in turn to detect marks with a diameter or a width of between 0.1 mm and 0.5 mm and substantially greater, for example, very well by the x-ray CT method.

In an embodiment according to the invention, the component is not fused or solidified by the generative manufacturing method in the region of the mark. The powder is correspondingly not irradiated by the energy radiation source in the region of the mark.

According to an embodiment of the invention, the component has several marks, which are arranged in the component uniformly or non-uniformly and wherein the marks have the same shape and/or dimensioning or a different shape and/or a different dimensioning. The arrangement, dimensioning and/or shape of a mark may be selected as a function of the stress to be examined or to be expected.

In an embodiment of the invention, the component is an engine component, for example, in particular at least one part of an engine blade or an engine housing.

The foregoing embodiments and further developments may be combined with one another at will where meaningful. Other possible embodiments, further developments and implementations of the invention also include combinations of features of the invention described with respect to the exemplary embodiments that are not mentioned explicitly in the foregoing or in the following. In particular, in doing so, a person skilled in the art will also add individual aspects as improvements or supplements to the respective basic form of the present invention.

The invention will be explained in greater detail in the following on the basis of the exemplary embodiments indicated in the schematic figures of the drawings.

DETAILED DESCRIPTION OF THE DRAWINGS

Figure 1:
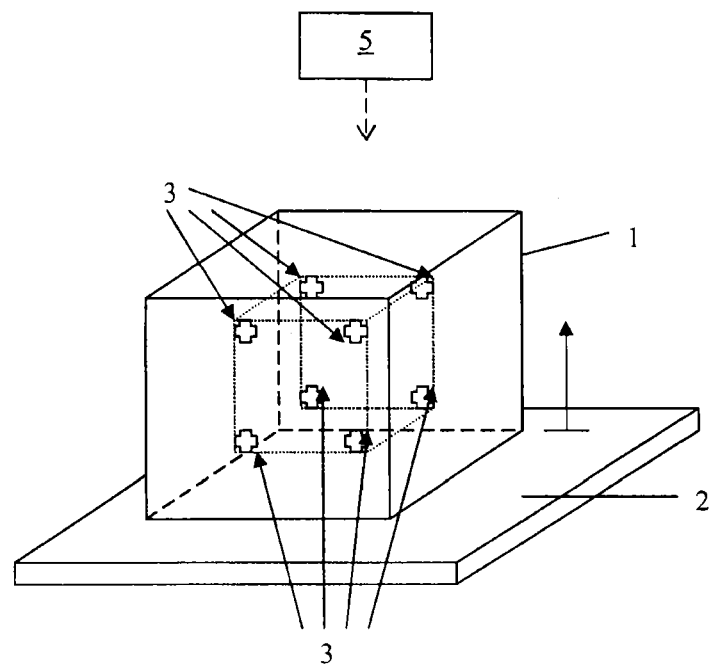
FIG. 1 is a perspective view of a component produced by a generative manufacturing method according to one embodiment of the invention.

Unless otherwise indicated, elements, features and components that are the same, functionally-equivalent and have the same effect are respectively provided with the same reference numbers in the figures of the drawing.

FIG. 1 shows a perspective view of a component 1 according to the invention, which was produced by a generative manufacturing method. The component 1 in FIG. 1 is depicted in a very simplified manner.

Generative manufacturing methods are, for example, the so-called rapid manufacturing and so-called rapid prototyping, etc. In doing so, the material to be added or applied is processed in powder form in the case of the corresponding generative methods, which are known as laser sintering, selective laser sintering (SLS), electron beam sintering, electron beam melting (EBM), lasercusing, selective laser melting (SLM) or 3D printing, for example. According to the invention, a powder of at least one metal, one metal alloy, one plastic and/or ceramic may be used, for example. However, the invention is not limited to the cited generative manufacturing methods, or to the material or the material combination of the powder.

In the case of so-called selective laser melting (SLM) as an example of a generative manufacturing method, the to-be-processed material is applied layer-by-layer in powder form on a support 2 or a construction platform. The powdery material of the respective layer or powder coat is then locally completely remelted by a suitable energy radiation such as, for example, laser radiation or electron radiation from an energy radiation source 5 in a component region of the to-be-produced component and forms a solid material layer after solidification. To apply the next powder coat, for example the support 2 or the construction platform is moved, e.g., lowered, by a layer thickness, and the new powder coat is applied and then the component region of the new powder coat is correspondingly solidified by laser radiation. This cycle is repeated until all layers have been remelted or the finished component 1 has been produced from the solidified component regions of the powder layers. Then, excess powder is cleaned off the finished component 1 and, depending upon needs, may be either processed or immediately used.

Stress such as, for example, extreme internal stress, may occur when constructing generatively manufactured components. Until now it has been possible to detect the stress only locally and at great expense or not at all by conventional methods such as, for example, x-ray diffraction, hole-drilling method, and neutron diffraction. Nevertheless, information about the internal stress condition is essential in order to be able to optimize process parameters for generatively producing the components. Such process parameters are, for example, process parameters of the generative manufacturing method such as, for example, an output of the energy radiation source (e.g., a laser output of a laser as an energy radiation source), a weld time, a track size of the energy radiation source (e.g., a laser track size with a laser as the energy radiation source), a preheating temperature of the powder, etc. The invention is not limited to the cited process parameters.

Therefore, according to the invention, at least one or more three-dimensional marks 3 are introduced in the component 1 being manufactured generatively during generative construction in the component volume, as FIG. 1 shows, to determine stress occurring in the component 1. The marks 3 having a three-dimensional, predetermined shape, e.g., a crossed slot (as indicated in FIG. 1), etc., may be arranged in this case in the component 1 uniformly or non-uniformly, depending upon the function and intended purpose. The marks 3 in this case may be formed by the generative manufacturing method with the defined or predetermined three-dimensional initial shape. In this case, the component is irradiated in the course of the generative manufacturing method by the energy radiation of an energy radiation source 5, such as a laser or an electron beam source, only in its component region and not, however, in the region of its at least one mark. The region of the mark 3 in the component 1 is therefore not solidified.

With the finished component 1, the change in the shape or initial shape of the mark 3 may then be used to determine whether and what stress, e.g., internal stress, the component 1 has experienced since the initial shape of the mark 3 changes correspondingly in the event of stress in the component 1.

Based on the stress of the component 1 that is established, such as, for example, internal stress, it is possible to appropriately adapt, for example, process parameters of the generative manufacturing method like the output of the energy radiation source, etc., in order to reduce and/or purposefully adjust the stress in components subsequently being manufactured by the generative manufacturing method such as series components. As a result, the generative manufacturing method is correspondingly optimized and the stress in the components 1 minimized and/or adjusted in a targeted manner.

The component 1 with the at least one mark 3 may be designed in this case as a specimen component. Based on the specimen component 1 and the analysis of its mark or marks 3, the process parameters of the generative manufacturing method are then optimized. Then it is possible to manufacture finished components, for example, without these types of marks or with other marks by the optimized manufacturing method, wherein these components have reduced stress such as, for example, internal stress because of the optimized generative manufacturing method.

Similarly, the component 1 may also be configured as a finished component and be provided with one or more marks. The advantage of the marks 3 in the finished component 1 is that they may be used as sensors for determining stress such as, for example, internal stress and/or load-induced stress, etc., of the component 1. As a result, it is possible to establish how the stress of the component 1 develops or changes in different operating states of the component 1 or during the service life of the component 1. The change in the initial shape of the respective mark 3 in different operating states or over a specific time period is therefore determined hereby, and it is ascertained herefrom which stress occurs in the component 1 in the process.

Figure 2:
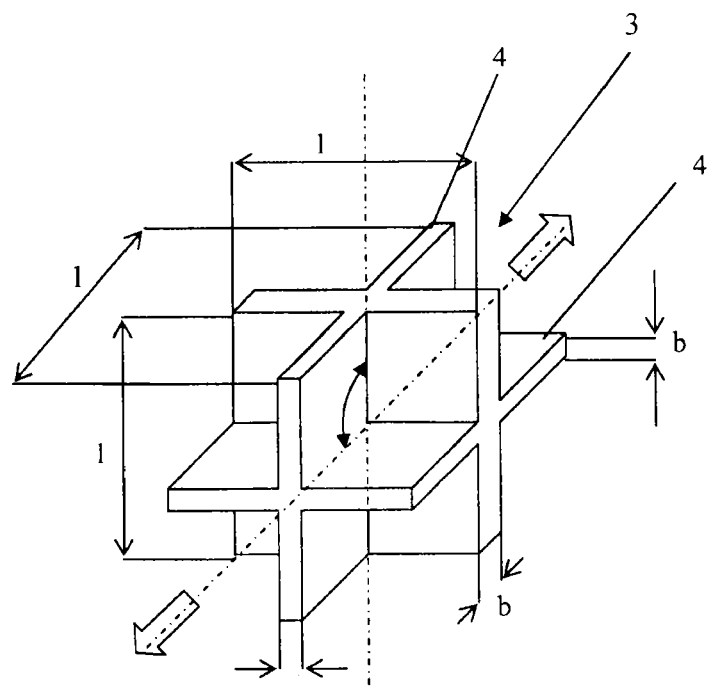
FIG. 2 is a perspective view of an embodiment of a mark of the component according to the invention in accordance with FIG. 1.

An example of a mark 3 is shown in FIG. 2. FIG. 2 shows a perspective view of a mark 3 as previously introduced in the component 1 shown in FIG. 1.

In this case, the cross-shaped mark 3 has, as an initial shape, two cross-shaped, 3-dimensional slots 4, wherein the slots 4 of the mark 3, for example, have the same slot width b and the same slot length l. As FIG. 2 shows, the two cross-shaped slots 4 are aligned with their longitudinal axes perpendicular to one another, for example, and together form the mark 3. These types of marks 3 are constructed such that they react sensitively to the stress of the component, which arises, for example, during the generative construction of the component or during subsequent use of the component.

In this case, the cross-shaped slots 4 of the mark 3 in FIG. 2 may now be provided in the component in such a way that an occurring load acts, for example, in the longitudinal direction of one of the two cross-shaped slots 4 of the mark 3, as indicated by the two arrows in FIG. 2. As a result, the slot widths of the mark 3 change corresponding, as shown in the following FIG. 3. It is possible to draw conclusions about the stress occurring in the component from the changed slot widths of the mark 3. Based on the stress that is determined, it is then possible, for example, to optimize the generative manufacturing method in such a way that the stress is reduced during the production of additional components by the optimized generative manufacturing method. Similarly, it is also possible to use the mark 3 with the component as a stress sensor. Using the mark 3 as a stress sensor, it is possible, for example, to determine where and what type of stress is occurring in the component, how strong the stress is, and how the stress changes during the service life of the component.

A slot 4 of the cross-shaped mark 3 may basically have any desired width as long as the width can be determined or analyzed with an appropriate, preferably non-destructive test method. The width of a slot 4 of the cross-shaped mark 3 may be in a range between 4 μm to 8 μm, for example, if an ultrasonic method is being used to determine the slot width. The ultrasonic method is able to be used to determine a change in the slot width in the range of 4 μm to 8 μm. This functions even if the powder particles of the powder for producing the component by a generative manufacturing method are themselves larger than. the slot. For example, the powder particles may have a size, for example, between 10 μm and 80 μm and larger and the width b of a slot 4 of the mark 3 may be, for example, only a width b between 4 μm to 8 μm. In this case, a powder particle is fused so to speak only outside the slot 4 during the generative manufacturing and not in the region of the slot 4. The powder particles are not fused in this region. Likewise, the powder particles may also be equally large or smaller than the slot width b of a slot 4 of the mark 3.

In addition, a slot 4 of the cross-shaped mark 3 may also have a width b for example in a range of 0.1 mm to 0.5 mm and larger if, for example, an x-ray CT method is used to determine the slot width b. A slot 4 with a width b in the range of, for example, 0.1 mm to 0.5 mm is able to be detected without a problem by the x-ray CT method.

The invention is not limited to a cross-shaped mark 3 having two cross-shaped slots 4 (initial shape), but may have any desired shape. The initial shape of the mark 3 changes due to stress such as, for example, internal stress or load-induced stress, and it is possible in-turn to draw conclusions from this change in the initial shape of the mark 3 about the stress present in the component. The shape or initial shape of the mark 3 may be varied as desired and may be, for example, spherical, oval and/or angular, etc.

In this case, it is possible, as previously described, to produce the component as a specimen part or a finished component with one or more such marks 3 by a generative manufacturing method. In the process, the powder (e.g., a powder of at least one metal, one metal alloy, one ceramic, and/or one plastic), which can be solidified by the energy radiation source 5, is not solidified in the region of the respective mark 3 by the energy radiation of an energy radiation source 5, but the region is spared and is correspondingly not solidified. If, in this case, the mark 3 is located inside the component, then the non-solidified powder of the mark 3 is not removed, but virtually surrounded or sealed by the component solidified by the surrounding energy radiation. If the mark 3 is configured on the surface of the component, then the non-solidified powder of the mark 3 may be removed again, but it is not absolutely necessary.

Figure 3:
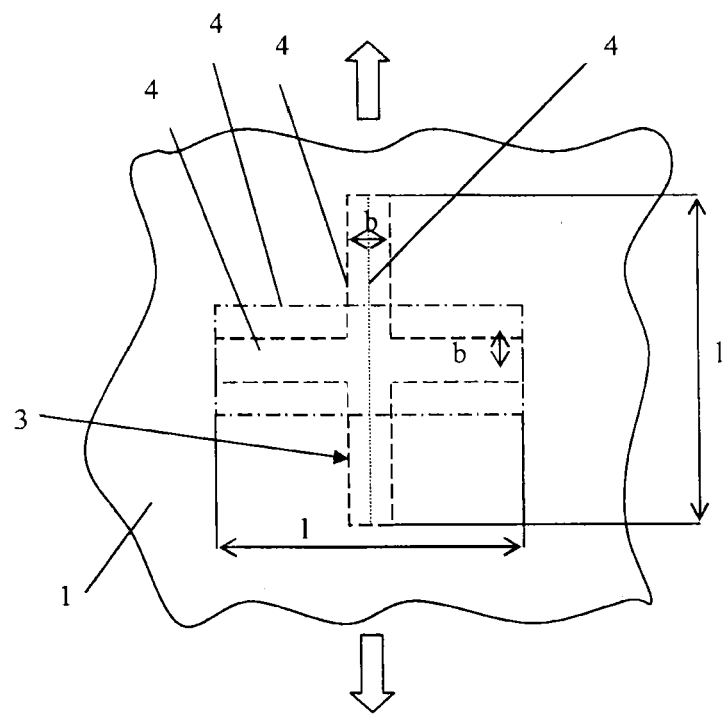
FIG. 3 is a top view of a section of the component and one of its marks according to FIG. 1.

FIG. 3 shows a top view of a section of the component 1 and one of its marks 3 according to FIG. 1. The cross-shaped mark 3 in this case is formed of two cross-shaped slots 4, as was previously shown as an example in FIG. 2.

As indicated in each of FIGS. 2 and 3 by the two arrows, a load, e.g., due to internal stress or load-induced stress, acts, for example, in the longitudinal direction of one of the cross-shaped slots 4. The initial shape of the slots 4 of the mark 3 is depicted in this case with a dashed line and the slots each have, for example, the same slot width b and slot length l.

The load that occurs now causes the slot 4, which runs in the direction of the load, to contract and at least partially or essentially completely close, as indicated by a dotted line in FIG. 3. The slot 4 of the mark 3, which in-turn runs transverse to the load, is stretched, on the other hand, in terms of the width, as indicated by a dashed-and-dotted line in FIG. 3.

Figure 4:
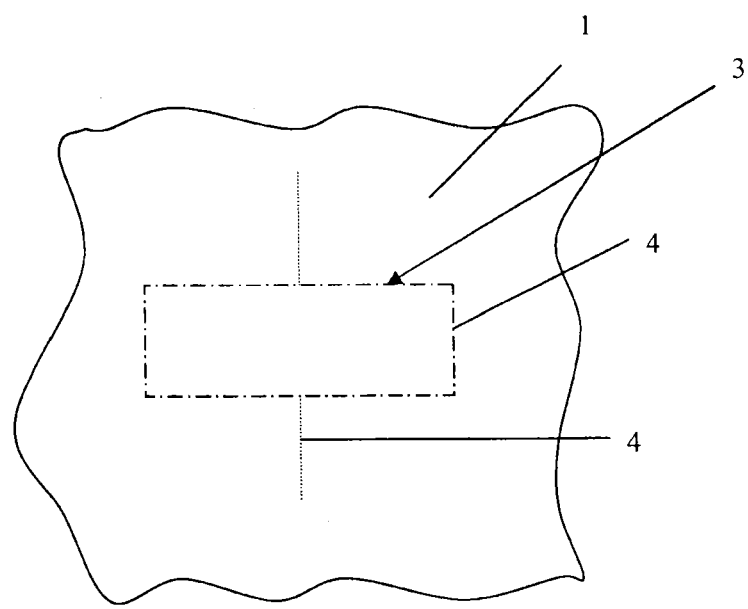
FIG. 4 is the top view of the section of the component and its mark according to FIG. 3 in a radiography.

FIG. 4 shows a top view of the component 1 with one if its cross-shaped marks 3 according to FIG. 3 in a radiography. In this case, the radiography shows the changed outline shape of the two cross-shaped slots 4 of the mark 3. The contracted slot 4 running in the direction of the load, as indicated by a dotted line, is not visible or hardly visible in the radiography. On the other hand, the stretched-out slot 4 running transverse to the load, as indicated by a dashed-and-dotted line, is easily visible in the radiography. Based on the radiography, it is therefore possible to determine the direction in which loads or stress occur in the component 1.

The radiography method, the ultrasonic method and the x-ray CT method in this case are three of a plurality of examples of non-destructive test methods that may be used to evaluate or analyze these micro-structured marks individually or in combination. These test methods therefore respectively supply an overall picture of stress such as internal stress or load-induced stress, in a component, as the radiography of the component according to FIG. 4 shows.

The advantage of the invention is that quick and precise knowledge of the complete stress state of a generatively produced component is able to be obtained. As a result, production process parameters such as those of the generative manufacturing method are able to be adjusted and optimized in a targeted manner. Thus, it is possible to manufacture, for example, a component 1 that is largely free of internal stress or to adjust stress states in special component regions in a targeted manner. Therefore, internal compressive stress states, for example, are able to be provided in boundary layers of the component 1 by processing a respective boundary layer of the component, for example, by shot peening, surface rolling, laser shock radiation (laser shock peening) and/or ultrasonic impact treatment (UIT).

These marks 3 in the component 1 may also be removed again as needed or at least made smaller by a corresponding downstream process, such as hot isostatic compression, etc., for example. Hot isostatic compression may be used to partially or completely disintegrate the marks 3 in the component 1. Providing components 1 with marks 3 is therefore applicable both for test components or specimen components as well as for finished components or series components.

Figure 5:
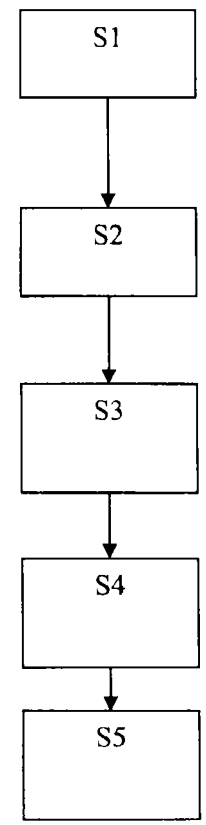
FIG. 5 is a flow chart of an exemplary embodiment of a method for manufacturing, repairing and/or replacing a component having several marks according to the invention.

FIG. 5 shows a flow chart of an exemplary embodiment of a method for producing, repairing and/or replacing a component having one or more marks according to the invention.

In this case, a powder coat, e.g., a metal powder coat, that is to be selectively solidified by energy radiation, is applied on a construction platform in a step S1. In a next step S2, the powder coat is selectively solidified. To this end, the powder coat is solidified by an energy radiation such as, for example, a laser beam and/or an electron beam, of an energy radiation source in a component region to form the component. In this case, the component region does not include a mark being provided in the component. This means that the component region does not include the region for the mark, but spares it and, therefore, in contrast to the component region, the mark is not solidified by the energy radiation of the energy radiation source.

Then step S1 is repeated and the next selectively to-be-solidified powder coat is applied to the last powder coat and the component region of the powder coat is solidified. Steps S1 and S2 are repeated until the component with its at least one mark is completely constructed and in particular completely manufactured, repaired or replaced. In a step S3, the powder is removed after the component is completely constructed. In the case that a mark is formed in the surface of the component, then the un-solidified powder may or may not be removed from the mark.

In a step S4 internal compressive stress states may also be provided as an option in the component, for example, by shot peening, surface rolling, laser shock radiation (laser shock peening), and/or ultrasonic impact treatment (UIT) of the component.

Similarly, in addition or as an alternative, the marks may be partially or completely closed subsequently in a step S5 after the stress in the component has been determined, for example. The partial or complete closure of the marks may be carried out, for example, by hot isostatic compression of the component.

Although the present invention was described in the foregoing on the basis of the preferred exemplary embodiments, it is not limited thereto, but can be modified in diverse ways. In particular, the exemplary embodiments described in the foregoing can be combined with one another, in particular individual features thereof.

According to the invention, engine components, including blades and housing parts of an engine, for example, may be produced as components having at least one or more marks. The engine components in this case may be part of an aircraft engine. However, the invention is not limited to engine components.

Marks as stress sensors in finished components or series components may be provided in this case both in critical and/or non-critical regions of the respective component. It is hereby possible to detect stress such as internal stress, load-induced stress and other stress in the component as well as deformations of the component by a mark. The previously described component according to the invention may be manufactured of at least one metal, one metal alloy, one ceramic, and/or one plastic.

LIST OF REFERENCE NUMBERS

1 Component
2 Support
3 Mark
4 Slot
5 Energy radiation source

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for constructing a component, comprising the steps of:
   constructing the component by a generative manufacturing method;
   forming a mark in or on the component, wherein the mark has a predetermined initial three-dimensional shape; and
   determining a stress in the component from a change in the predetermined initial three-dimensional shape of the mark.

2. The method according to claim 1, wherein the steps of constructing the component and forming the mark include the steps of:
   providing an energy radiation source to solidify a powder that is solidifiable by the energy radiation source;
   providing a support to receive the powder;
   moving the support in such a way that a powder coat of the powder is applyable to the support; and
   solidifying of a component region of the powder coat by the energy radiation source, wherein the component region does not include the mark.

3. The method according to claim 2, wherein a diameter of powder particles of the powder is less than, equal to, or greater than a diameter or a width of the mark.

4. The method according to claim 1, further comprising the step of removing the mark by hot isostatic compression.

5. The method according to claim 1, further comprising the step of inducing internal compressive stress in the component by shot peening, surface rolling, laser shock radiation and/or ultrasonic impact treatment.

6. The method according to claim 1, wherein the component is an engine component.

7. The method according to claim 6, wherein the engine component is a part of an engine blade or an engine housing.

* * * * *